(12) United States Patent
Apiscopa et al.

(10) Patent No.: US 6,979,472 B2
(45) Date of Patent: **\*Dec. 27, 2005**

(54) SOLUBLE COFFEE BREW COLOR INTENSIFICATION

(75) Inventors: Richard Paul Apiscopa, Kingwood, TX (US); Lawrence Patrick Tighe, Houston, TX (US); David Brian Griffith, Cedar Knolls, NJ (US)

(73) Assignee: Kraft Foods Holdings, Inc., Tarrytown, NY (US)

( * ) Notice: Subject to any disclaimer, the term of this patent is extended or adjusted under 35 U.S.C. 154(b) by 588 days.

This patent is subject to a terminal disclaimer.

(21) Appl. No.: 10/137,322

(22) Filed: May 3, 2002

(65) Prior Publication Data

US 2003/0207017 A1 Nov. 6, 2003

(51) Int. Cl.[7] .............................. A23F 5/00; A23F 5/28
(52) U.S. Cl. .................... 426/594; 426/433; 426/434; 426/387; 426/492
(58) Field of Search ............................. 426/594, 433, 426/434, 387, 492

(56) References Cited

U.S. PATENT DOCUMENTS

| | | | | |
|---|---|---|---|---|
| 2,680,687 A | * | 6/1954 | Lemonnier | 426/386 |
| 2,992,978 A | * | 7/1961 | Kelly | 202/160 |
| 3,113,876 A | * | 12/1963 | Smith et al. | 426/387 |
| 3,155,523 A | * | 11/1964 | Reich | 426/430 |
| 4,081,561 A | * | 3/1978 | Meyer et al. | 426/385 |
| 4,107,339 A | * | 8/1978 | Shrimpton | 426/387 |
| 4,341,804 A | * | 7/1982 | Prasad et al. | 426/387 |
| 4,794,010 A | * | 12/1988 | Jones et al. | 426/387 |
| 6,120,831 A | | 9/2000 | Zeller et al. | |
| 6,149,957 A | * | 11/2000 | Mandralis et al. | 426/387 |
| 6,399,131 B2 | * | 6/2002 | Zeller et al. | 426/520 |

* cited by examiner

*Primary Examiner*—Anthony Weier
(74) *Attorney, Agent, or Firm*—Stites & Harbison PLLC,; Marvin Petry

(57) ABSTRACT

A method is provided for producing a soluble coffee extract which, when reconstituted, produces an intensified in-cup brew color without altering the flavor of the cup of coffee. The method includes heating a coffee extract at a temperature and for a time selected to produce an intensified color coffee extract without altering the flavor of the coffee. The intensified color coffee is either immediately dried to form dried intensified color coffee or cooled while in the liquid state. The soluble coffee produced by this method has intensified color while its flavor remains unaltered. As desired, the soluble coffee may be packaged as an instant coffee, combined with traditional soluble coffee, incorporated into a liquid coffee product or combined with sugar, creamer, and flavors to form various soluble coffee products. Alternatively, the coffee exact may be directly incorporated into a ready-to-drink or a concentrated liquid coffee product without undergoing a drying step.

16 Claims, 5 Drawing Sheets

SOLUBLE COFFEE BREW COLOR INTENSIFICATION

FIELD OF THE INVENTION

The present invention relates to a method of intensifying the brew color of soluble coffee without affecting flavor, and in particular, to a method which includes heating a coffee extract at a temperature and for a time selected to produce an intensified color coffee extract without altering the flavor of the coffee.

BACKGROUND OF THE INVENTION

Soluble coffee products, often referred to as "instant coffee," are prepared from aqueous extracts of roasted and ground coffee. The products are generally in the form of spray-dried or freeze-dried particulate solids.

Traditionally, soluble coffee is made by the known art of percolation in which roast and ground coffee of a specific roast color for each product design is extracted using hot water to produce an aqueous coffee extract. Next, the aqueous coffee extract is typically immediately cooled upon exiting the percolator to less than 95° F. to maintain flavor integrity. The aqueous solution is then centrifuged to remove any extraneous insoluble solids. The solution or in some instances part of the solution is then evaporated at low temperatures under vacuum, typically no higher than 160° F., to remove water and aroma while maintaining flavor integrity. The resulting solution which can be from 20 to 58% soluble solids concentration is converted to a low moisture coffee powder using known art techniques of spray-drying or freeze-drying with aroma addback.

The flavor of the resulting coffee is controlled through bean blend, roast color of the roast, and ground and percolation conditions. However, the conventional perception of the in-cup flavor and associated strength is the brew color. Darker roasted coffees taste substantially different than lighter roasted coffees and the in-cup brew color of a darker roasted coffee is substantially darker than the brew colors of light roasted coffees.

In the soluble coffee art there has been minimal emphasis in trying to achieve a dark espresso type cup of coffee without the burnt flavor notes that typically accompany dark roasts. The conventional methods of producing soluble coffee are focused on flavor quality, yield, efficiency, product powder color, powder density and fines. The in-cup brew color (i.e., the color of re-constituted soluble coffee) is typically accepted to be a function of the roast color of the roast and ground coffee from which the soluble coffee was produced.

One conventional method of manipulating the brew color of 100% pure coffee products is provided via the roast color of the coffee beans prior to percolation. However, this conventional method also has the consequence of altering the flavor of the resulting coffee to a certain extent depending on the degree of roast.

For example, U.S. Pat. No. 6,120,831 to Zeller, et al., herein incorporated by reference, discloses a method of increasing the flavor and color of soluble coffee by heating the soluble coffee at a temperature and for a time sufficient to intensify the flavor and color of the coffee without causing carbohydrate pyrolysis.

Another previous method for increasing the in-cup brew color is provided U.S. Pat. No. 6,399,131 entitled "Soluble coffee having intensified flavor and color and method of making the same from a coffee extract," herein incorporated by reference. In the U.S. Pat. No. 6,399,131 method, the coffee extract is heated to a desired temperature for a desired time to intensify both the color and flavor of the coffee extract. As a result, the U.S. Pat. No. 6,399,131 method produces a soluble coffee extract, and subsequent in-cup brew coffee, with intensified color and flavor as compared with soluble coffee not subjected to its intensification method. However, this process affects both color and flavor and therefore, the color cannot be changed without affecting the flavor of the coffee.

Thus, the prior art, e.g. U.S. Pat. No. 6,120,831 and U.S. Pat. No. 6,399,131, teaches that manipulating the brew color through heating the coffee extract necessarily affects the resulting coffee flavor.

There is a need in the art to have a method of increasing in-cup brew color of a soluble coffee extract without affecting (i.e. altering) the flavor coffee extract or the flavor of the coffee after reconstitution of the soluble coffee extract.

BRIEF SUMMARY OF THE INVENTION

It is thus an object of the present invention is to provide a method for producing intensified coffee color while not altering coffee flavor.

In accordance with the general object of the present invention, a method is provided for producing a soluble coffee extract which, when reconstituted, produces an intensified in-cup brew color without altering the flavor of the cup of coffee. The method includes heating a coffee extract at a temperature and for a time selected to produce an intensified color coffee extract without altering the flavor of the coffee. The intensified color coffee extract is then immediately dried, without first cooling the coffee extract, to form a soluble coffee powder. The dried soluble coffee then may be packaged as an instant coffee, combined with traditional soluble coffee, incorporated into a liquid coffee product or combined with sugar, creamer, and flavors to form various soluble coffee products.

Alternatively, rather than immediately drying the liquid intensified color coffee extract, the intensified color coffee extract, while in the liquid state, is cooled to stop the intensification process. Cooling the coffee extract is preferable if the coffee extract is not rapidly dried or if the coffee extract is to be incorporated into a liquid coffee beverage. For example, the cooled liquid coffee extract can be directly incorporated into a ready-to-drink or a concentrated liquid coffee product without undergoing a drying step.

Selecting an optimal temperature and time is advantageous since too high of a temperature and/or too long of a processing time period will alter the coffee flavor while too low of a temperature and/or too short of a processing time period will not have the desired effect in terms of in-cup brew color intensification. Thus, two factors which together affect the color and flavor of coffee extract are temperature and time. For example, if the coffee extract is held beyond a specific time period and/or held at too high of a temperature, the flavor will be affected and if the coffee extract is not held long enough, no color change will be observed.

An advantage of the present coffee color intensification method is that the color intensification method may be easily incorporated into a standard instant coffee manufacturing process. For example, coffee extract that exits the percolators can be collected, concentrated or evaporated, as necessary, and then heated at a temperature for a period of time to provide color intensification.

In one preferred embodiment, a method of intensifying the color of coffee extract without altering the flavor of the coffee extract includes selecting a temperature and a time for intensifying the color of a coffee extract. Next, the coffee extracted is heated at the temperature and time to thereby produce intensified color coffee extract without altering the flavor of the coffee extract. In alternate, further embodiments, the method includes either immediately drying the intensified color coffee extract to form dried intensified color coffee or cooling the coffee extract while in the liquid state.

The present invention, in another form thereof, concerns a method of intensifying the color of coffee extract which includes producing a coffee solution by extracting water with ground coffee beans and concentrating the coffee solution via evaporating to form the coffee extract and removed aroma flavor. A temperature and time for optimizing color of a coffee extract is selected and the coffee extract, which is substantially free of ground coffee, is heated at the temperature and the time to intensify the color of the coffee extract without altering the flavor of the coffee extract to thereby produce intensified color coffee extract. The aroma flavor removed while concentrating the coffee solution, is adding back to the now intensified color coffee extract. In alternate, further embodiments, subsequent to adding back the removed aroma flavor, the method includes either immediately drying the intensified color coffee extract to form dried intensified color coffee or cooling the coffee extract, while in the liquid state.

Further features and advantages of the present invention will be set forth in, or apparent from, the detailed description of preferred embodiments thereof which follows.

BRIEF DESCRIPTION OF THE DRAWING

The invention will now be described in detail with respect to preferred embodiments with reference to the accompanying drawings, wherein.

DESCRIPTION OF PREFERRED EMBODIMENTS

Figure 1:
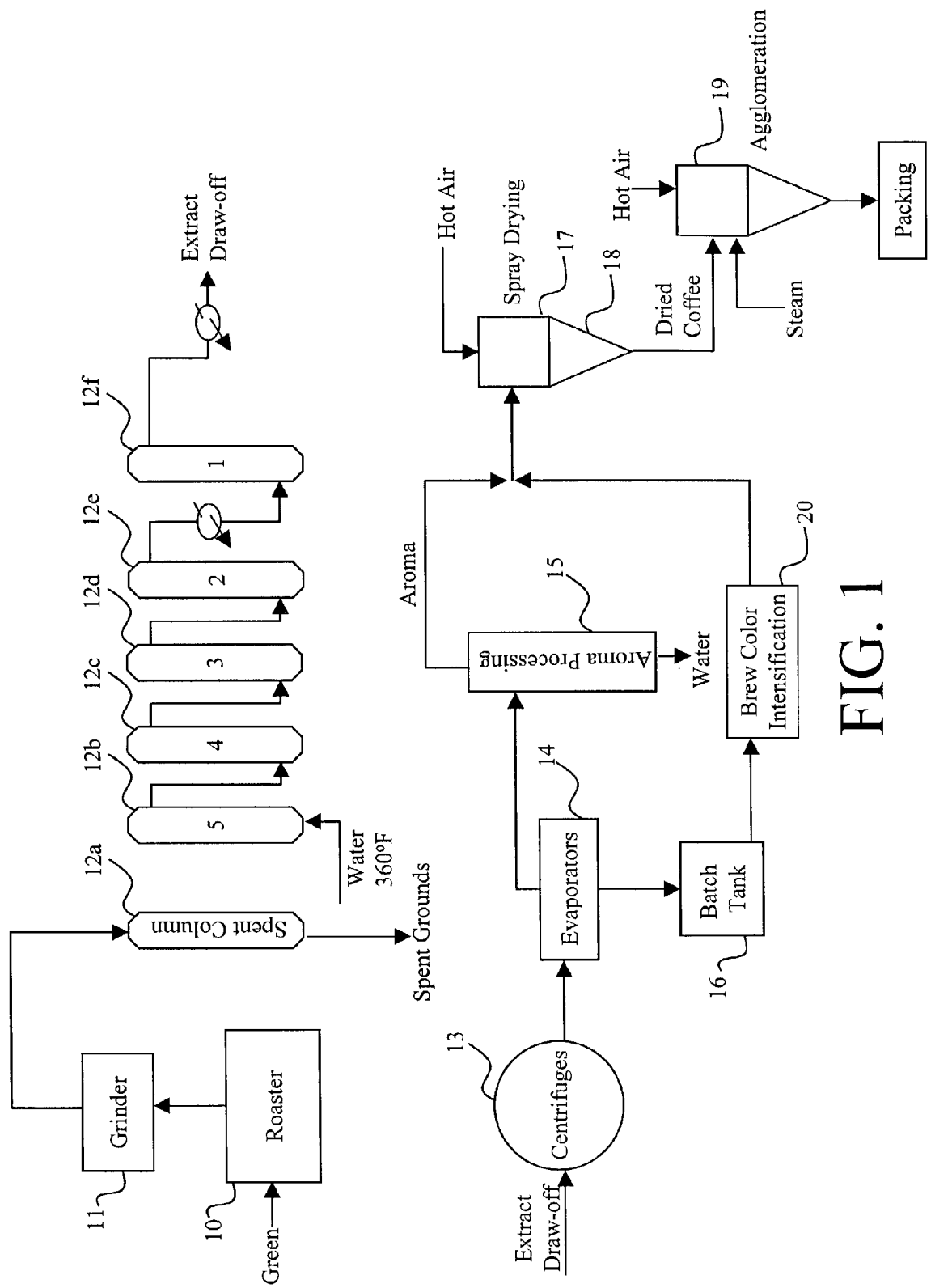
FIG. 1 is a schematic depicting a method for manufacturing a soluble coffee extract according to the present invention.

Referring to the drawings, like numbers represent like elements throughout the several views. In the preferred process, coffee extract is heated at a temperature and for a time selected to produce an intensified color coffee extract without altering the flavor of the coffee.

Referring now specifically to FIG. 1, coffee beans are fed to a roaster 10 and the coffee beans are roasted to a color in accordance with a soluble coffee product design. The coffee beans may be any bean type and include Robusta or Arabica, caffeine-containing or decaffeinated.

The roasted whole beans are degassed for a brief period to minimize extract foaming in the percolator set. The beans are then fed to a grinder 11 to reduce the size of the coffee bean for optimum extraction in the percolator set. The ground coffee is loaded into columns 12a–12f as needed during the percolation cycle. The columns 12a–12f form a percolation train of 6 percolators connected in series. Percolation is a semi-continuous process in which one of the 6 columns, e.g. column 12a, is always offline for discharging the spent grounds for disposal, and then refilled with fresh roast and ground coffee from grinder 11 before column 12a is put back online for extraction.

Typically, hot water enters the most spent column in the percolator train, e.g. column 12b. The hot water flows through each of the columns in series to leach out and generate soluble coffee solids. The hot water turned coffee extract flows through each column 12b–12e and then flows through a cooler prior to entering the column with fresh roast and ground coffee 12f. The coffee extract from the fresh column 12f goes through an aftercooler and then to a hold-up tank until a target extract drawoff weight is achieved. When the target weight is met, the spent column 12b is then taken offline and the hot water is then fed to the next most spent column, which will now be column 12c. At this point, column 12a becomes the most fresh column and the position of the cooler is moved from between columns 12e–12f to between columns 12a–12f. The final aftercooler is moved to the discharge of the freshest column, i.e. column 12a. Once the extract discharge target weight from the freshest column is achieved, typically between 15 and 50 minutes, the cycle begins all over again.

Coffee extract may be prepared by conventional percolation methods. Such conventional methods are, for example, described in U.S. Pat. No. 2,915,403 which is herein incorporated by reference. In one preferred method, first, the coffee is brewed using a percolation process at a very high temperature. A countercurrent extraction method is utilized wherein water passes through a packed bed of unextracted roast and ground coffee present in columns 12b–12f at a temperature of from about 180° F. to 250° F. The temperature of the feed water is introduced into column 12b, preferably at around 360° F. The coffee extract drawn off column 12f is cooled, preferably to around 95° F. to minimize flavor degradation. The concentration of the extract is between 12 and 16% soluble solids and an extract yield of typically around 50%.

The coffee extract will normally have a high level of sediment after percolation. The sediment is removed from the coffee extraction using a clarification process which advantageously uses a process of centrifugation. During centrifugation, the coffee extract is fed to centrifuges 13, which spin at a high rate of speed sufficient to separate out solubles compounds from in-solubles present in the coffee extract.

The clarified coffee extract is then concentrated using an evaporation process. The evaporation process includes concentrating the coffee extract under vacuum at evaporators 14. The evaporators 14 produce a concentrated coffee extract which is concentrated to 20% to 58% soluble solids. In addition, during evaporation, a condensate is generated. In order to preserve coffee extract flavor and integrity, typically operational temperatures are 160° F. or less if under vacuum.

A portion of the condensate generated by evaporations 14 is transferred for aroma processing, denoted as box 15. Aroma processing consists of recovering coffee flavors that have been stripped during evaporation and entrained in the condensate.

The concentrated extract is transferred from evaporations 14 to a batch tank 16 and the concentrated coffee extracted is brought up to 130° F. Then, the concentrated extract is transferred to a brew color intensification process denoted as box 20 and shown in further detail in FIG. 2.

Figure 2:
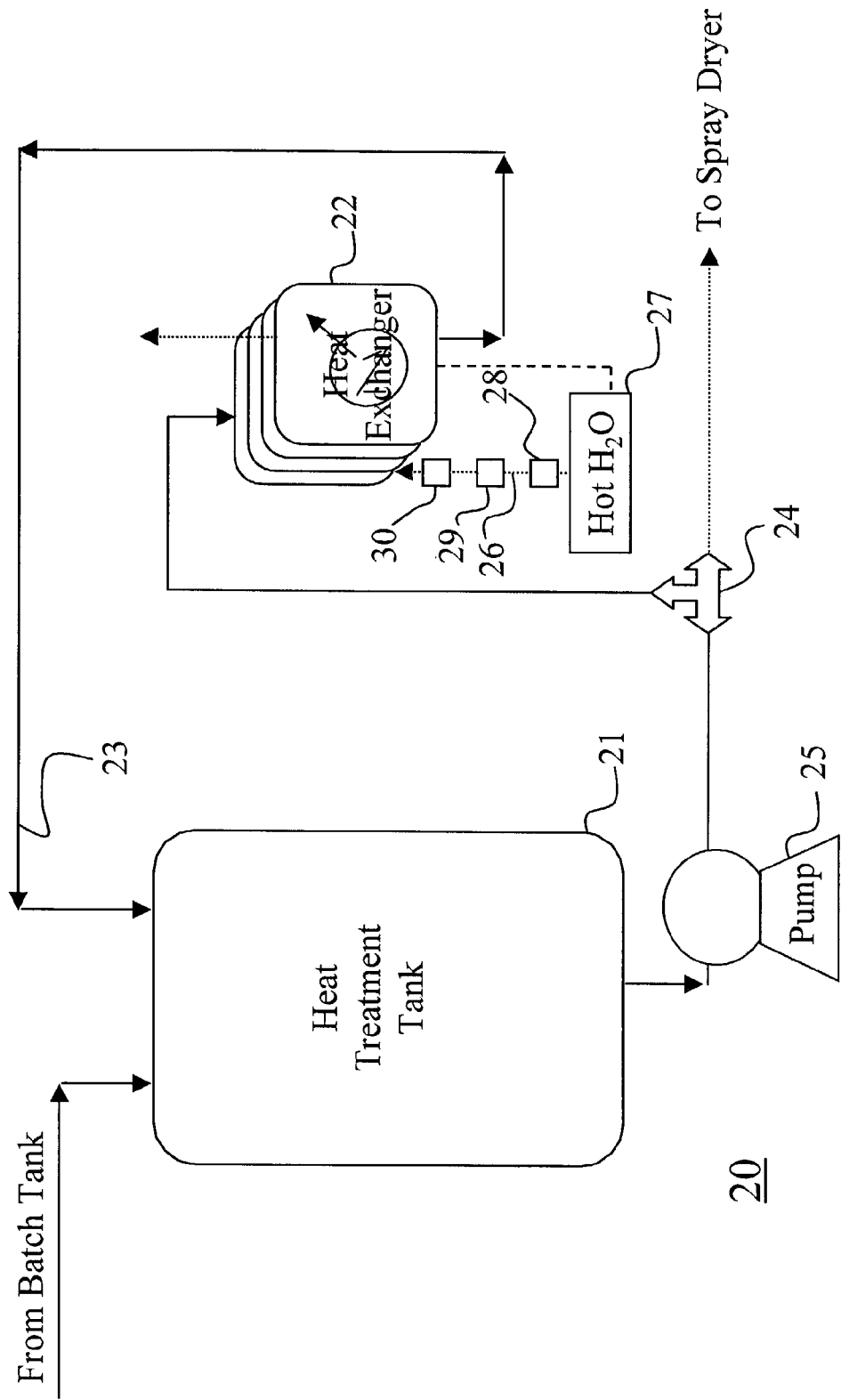
FIG. 2 is a more detailed schematic of the brew color intensification process of the method shown FIG. 1.

As shown in FIG. 2, preferably, during the brew color intensification process, the batch of coffee extract is circulated from a heat treatment tank 21, through a heat exchanger 22 along an extraction recirculation loop 23 with the aid of circulation pump 25. The heat exchanger 22 includes a plate heater with a hot water jacket.

A hot water loop 26, denoted by dotted lines, consists of a hot water supply tank 27 and a water circulation pump 28 which feeds hot water through a steam heater 29, heat exchanger 22, and back to the hot water supply tank 27. A control valve 30 on the feed water inlet line to the heat exchanger 22 maintains a set-point temperature.

In one preferred brew color intensification process, the batch of coffee extract is circulated along the recirculation loop 23 at 190° to 200° F. for 30 minutes. After 30 minutes of heat treatment, a three-way valve 24 diverts the coffee extract from the extraction recalculation loop 23 and re-directs the coffee onto a spray dryer feed tank 17 (FIG. 1).

In an non-limiting example, the preferred brew color intensification process accommodates a 3,000 pound batch of coffee extract which is pumped to the heat treatment tank 21 from a batch tank 16 maintained at 130° F. The heat treatment tank 21 has a 750-gallon capacity and includes an agitator.

It is advantageous to select an optimal time and temperature used in the brew color intensification process to produce a desired coffee extract color while maintaining the original coffee flavor. Two factors which together affect the color and flavor of coffee extract are temperature and time. Too high of a temperature and/or too long of a processing time period will alter the coffee flavor while too low of a temperature and/or too short of a processing time period will not have the desired effect in terms of in-cup brew color intensification. Preferable brew color intensification condition include a brew intensification temperature of 180° F. to 212° F., more preferably 190° F. to 200° F., a brew intensification time of 5 to 60 minutes, and more preferably, 15 to 30 minutes, and a coffee extract concentration of 30 to 60 percent while striped of preferred aroma.

For example, if the coffee extract is held beyond a specific time period and/or held at too high of a temperature, the flavor will be affected and if the coffee extract is not held long enough, no color change will be observed.

The heat treated coffee extract exits the brew intensification process 20 with intensified color but no detectable flavor change. The exiting intensified color coffee extract is combined with the aroma from the aroma processing 15 and combined coffee extract/added aroma is fed into spray dryer feed tank 17. Subsequently, spray dryer 18 dries the coffee extract to form dried (e.g. powered) coffee. The dried coffee is further processed by agglomerate 19 and then subsequently packaged.

Although the invention has been described in detail with respect to preferred embodiments thereof, it will be apparent to one skilled in the art that the invention is capable of numerous modifications and variations within the spirit and scope of the invention.

Further understanding of the present invention is provided with reference to the following examples which are provided only as illustrative of the present invention and do not limit its scope in any way.

EXAMPLE 1

Soluble coffee extract produced from roasted coffee with a roast color of 60° L (photovolt) is prepared using known art until immediately prior to spray-drying where upon the coffee extract is heated to 190 to 200° F. and held at that temperature for 10 to 60 minutes at atmospheric pressure. The extract is subsequently spray-dried. When reconstituted to a coffee concentration of 1% coffee solids, the in-cup brew color is noticeably darker than the same coffee that was not intensified thus giving the appearance of a dark rich cup of coffee when in fact the coffee was produced from what is known in the art as a light roast coffee. The flavor of the reconstituted intensified color coffee tastes the same as that of non-intensified color coffee.

Figure 3:
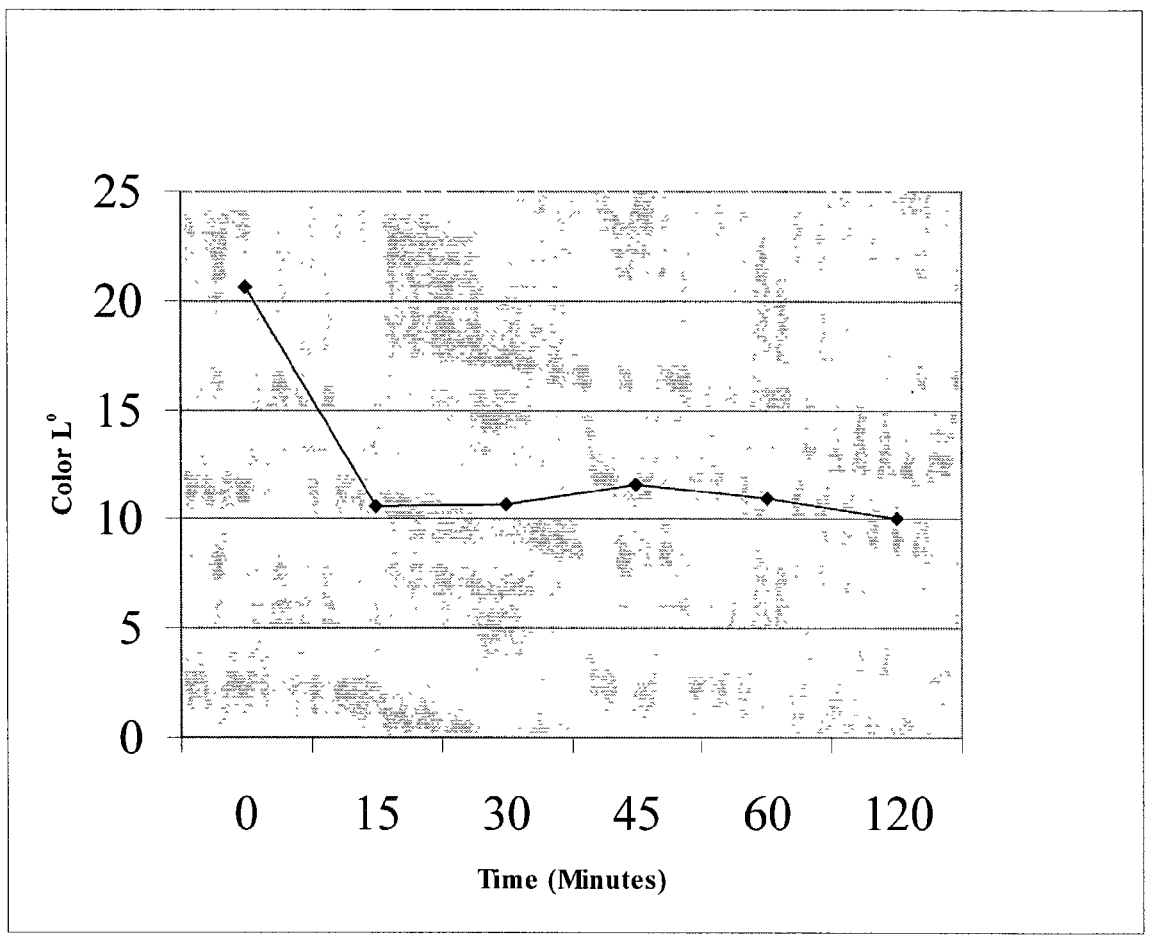
FIG. 3 is a plot depicting the relationship between roast color, and brew color intensity and the time of brew color intensification according to the present invention.

Referring to FIG. 3, the coffee brew color is compared to the brew intensification processing time for Example 1, where the y-axis comprises Macbeth Hunter values of the brew color and the x-axis is the hold-up time (i.e. brew color intensification processing time) of the coffee extract within the temperature range of 190° F. to 200° F. Color measurements of the intensified color coffee extract were taken at 15 minute intervals up to 120 minutes. From FIG. 3, it can be seen that the in-cup brew color gets significantly darker for coffee that have been treated using the present brew color intensification process.

One of ordinary skill will readily note from the decrease in Macbeth Hunter color valves of FIG. 3, that a significant darkening of the brew color occurs after approximately 10 minutes and that the brew color is darkest after approximately 15 to 30 minutes. Further, one of ordinary skill will appreciate that a difference in Hunter color value of 2 to 3 units is noticeable by an average person. As the time is increased beyond 30 minutes, the brew becomes marginally lighter until approximately 60 minutes, at which point the color begins to re-darken. However, as the color of the coffee re-darkens, the flavor begins to change significantly as compared with coffee not subjected to heat treatment (i.e. brew color intensification).

EXAMPLE 2

A first batch of soluble coffee extract produced from roasted coffee with a roast color of 40° L (photovolt) was prepared using conventional brewing processes known in the art, until immediately prior to the spray-drying step. Prior to a conventional spray-drying step, the coffee extract was heated to 190 to 200° F. and held at that temperature for 10 to 60 minutes. The extract was subsequently spray-dried.

A second batch of coffee extract produced from roasted coffee with a roast color of 37° L (photovolt) was prepared using a conventional brewing process including spray-drying. The second batch was not subjected to brew color intensification.

The two batches were reconstituted to the same coffee solids concentration. The two batches taste different from each other and the in-cup brew color are different. The 37° L batch tastes somewhat burnt and has a very dark brew color relative to the 40° L batch prior to brew color intensification.

Subsequently, the second batch, i.e. the 40° L batch, was subjected to the present brew color intensification process, thereby producing a darker coffee color from the 40° L roast color coffee beans as compared with the 37° L batch color, without exhibiting a burnt flavor.

Figure 4:
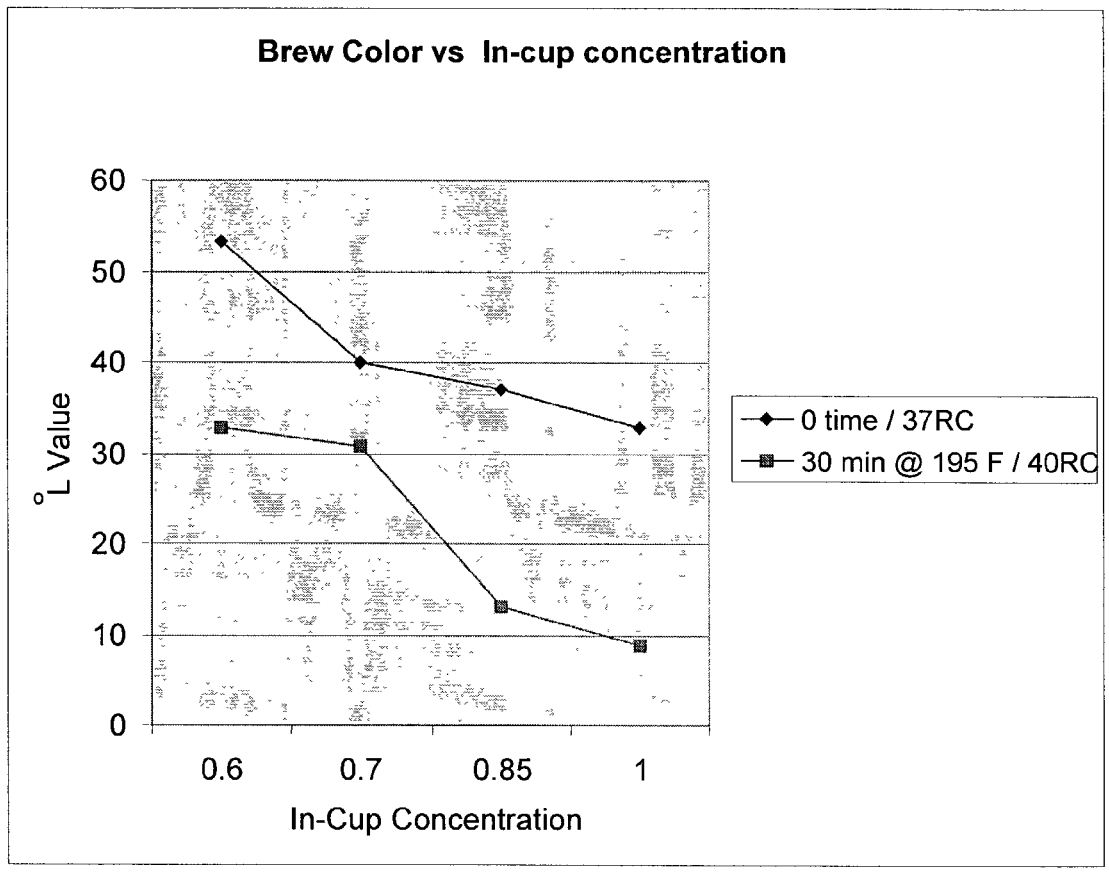
FIG. 4 is a plot showing the relationship between brew color and in-cup concentration at two different roast colors in accordance with the present invention.

Referring to FIG. 4 to further quantify Example 2, the y-axis comprises Macbeth Hunter values and the x-axis is in-cup concentration. It can be seen that for all in-cup concentrations identified, the in-cup color of the lighter roast color coffee is darker than the darker roasted coffee. As noted previously, prior to this invention, it was believed that when the roast color variable is changed, the darker roasts will produce a darker in-cup color. However, contrary to the previous notion, FIG. 4 clearly demonstrates that lighter roasted coffee can generate a darker in-cup color when subjected to the present brew color intensification process.

EXAMPLE 3

Two soluble coffee extract batches at 52% soluble solids concentration were heated to 175° F. and 195° F. and held for about 60 minutes. Samples at 15 minute intervals, beginning at time 0 samples, were spray-dried to form a dry powder. The spray-dried powder samples were then reconstituted to 1% soluble solids concentration and compared to each other.

Figure 5:
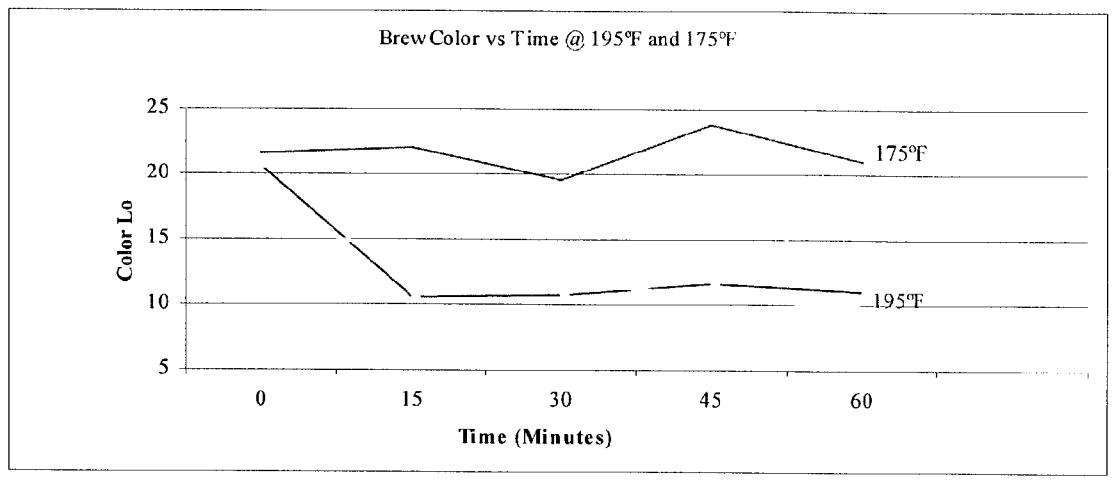
FIG. 5 is a plot showing the relationship between brew color and the time of the brew color intensification process of the present invention.

The results of Example 3 are presented in FIG. 5 which illustrates the brew color of the respective soluble coffee extracts produced. As shown in FIG. 5, the sample heated to 195° F. became substantially darker after 15 minutes and then the color intensity leveled off. Beyond 60 minutes, at 195° F., the flavor of the coffee began to change as determined organoleptically by a trained expert coffee panel. The sample heated at 175° F. had very little color change over the same time period. Extracts that were heated to a temperature higher than 195° F., e.g., greater than 200° F. developed off flavor notes probably due to degradation reactions.

What is claimed is:

1. A method of intensifying the color of coffee extract without altering the flavor of the coffee extract comprising:
    selecting a temperature from 180° F. to 212° F. and a time from about 5 minutes to about 60 minutes for intensifying color of a coffee extract; and
    heating the coffee extract at the temperature and the time to thereby produce intensified color coffee extract without altering the flavor of the coffee extract.

2. The method of claim 1 wherein the temperature is from 190° F. to 200° F.

3. The method of claim 1 wherein the time is from 15 to 30 minutes.

4. The method of claim 1 further comprises drying the intensified color coffee extract immediately following said heating the coffee extract to form dried intensified color coffee.

5. The method of claim 4 wherein said drying comprises one of spray-drying and freeze-drying.

6. The method of claim 1, further comprises cooling the intensified color coffee extract after said heating the coffee extract, thereby stopping brew color intensification.

7. The method of claim 1, further comprising:
    producing a coffee solution by extracting water with ground coffee beans;
    concentrating the coffee solution via evaporating to form the coffee extract and removed aroma flavor; and
    adding back the removed aroma flavor to the intensified color coffee extract.

8. The method of claim 7 wherein said concentrating the coffee solution comprises applying a vacuum to the coffee solution and maintaining the coffee solution at a temperature around 160° F. or less.

9. A method of intensifying the color of coffee extract comprising:
    producing a coffee solution by extracting water with ground coffee beans;
    concentrating the coffee solution via evaporating to form the coffee extract and removed aroma flavor;
    selecting a temperature and time for optimizing color of a coffee extract;
    heating the coffee extract which is substantially free of ground coffee at the temperature and the time to intensify the color of the coffee extract without altering the flavor of the coffee extract to thereby produce intensified color coffee extract; and
    adding back the removed aroma flavor to the intensified color coffee extract.

10. The method of claim 9 further comprises drying the intensified color coffee extract immediately following said adding back the removed aroma flavor to the intensified color coffee extract, thereby forming dried intensified color coffee.

11. The method of claim 9 further comprises cooling the heated intensified color coffee extract following said adding back the removed aroma flavor to the intensified color coffee extract, thereby stopping brew color intensification.

12. The method of claim 9 wherein the temperature is from 180° F. to 212° F. and the time is from about 5 minutes to about 60 minutes.

13. The method of claim 12 wherein the temperature is from 190° F. to 200° F.

14. The method of claim 12 wherein the time is from 15 to 30 minutes.

15. The method of claim 10 wherein said drying comprises one of spray-drying and freeze-drying.

16. The method of claim 9 wherein said concentrating the coffee solution comprises applying a vacuum to the coffee solution and maintaining the coffee solution at a temperature around 160° F. or less.

* * * * *